(12) United States Patent
Senile et al.

(10) Patent No.: US 11,391,158 B2
(45) Date of Patent: *Jul. 19, 2022

(54) COMPOSITE AIRFOIL ASSEMBLY WITH SEPARATE AIRFOIL, INNER BAND, AND OUTER BAND

(71) Applicant: General Electric Company, Schenectady, NY (US)

(72) Inventors: Darrell Glenn Senile, Oxford, OH (US); Matthew Mark Weaver, Loveland, OH (US); Alexander Martin Sener, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/170,988

(22) Filed: Feb. 9, 2021

(65) Prior Publication Data
US 2021/0254469 A1 Aug. 19, 2021

Related U.S. Application Data

(63) Continuation of application No. 15/922,263, filed on Mar. 15, 2018, now Pat. No. 10,927,677.

(51) Int. Cl.
*F01D 5/14* (2006.01)
*F01D 5/28* (2006.01)

(52) U.S. Cl.
CPC ............ *F01D 5/142* (2013.01); *F01D 5/147* (2013.01); *F01D 5/284* (2013.01); *F05D 2220/32* (2013.01); *F05D 2240/305* (2013.01); *F05D 2240/306* (2013.01); *F05D 2250/711* (2013.01);

(Continued)

(58) Field of Classification Search
CPC .......... F01D 5/142; F01D 5/147; F01D 5/284; F01D 9/02; F01D 9/041; F01D 9/042; F01D 9/047; F01D 9/04; F01D 25/24; F01D 25/243; F01D 25/246; F01D 25/28; F05D 2220/32; F05D 2240/305; F05D 2240/306;

(Continued)

(56) References Cited

U.S. PATENT DOCUMENTS 3,066,911 A * 12/1962 Anderson ............. F01D 25/246
415/138
8,152,451 B2 4/2012 Manteiga et al.
8,210,803 B2 7/2012 Schaff et al.
(Continued)

*Primary Examiner* — Woody A Lee, Jr.
*Assistant Examiner* — Justin A Pruitt
(74) *Attorney, Agent, or Firm* — Dority & Manning, P.A.

(57) ABSTRACT

Airfoil assemblies for gas turbine engines are provided. For example, an airfoil assembly comprises an airfoil, an inner band defining an inner opening shaped complementary to an inner end of the airfoil, and an outer band defining an outer opening shaped complementary to an outer end of the airfoil. The airfoil inner end is received with the inner opening, and the airfoil outer end is received within the outer opening. A strut extends radially through an airfoil cavity. A first pad is defined at a first radial location within the cavity. A second pad is defined within the cavity at a second, different radial location. In some embodiments, the airfoil assembly inner band includes a first inner flange, through which the inner band is secured to a support structure, and the outer band includes a first outer flange, through which the outer band is secured to a support structure.

20 Claims, 5 Drawing Sheets

(52) U.S. Cl.
CPC ............... *F05D 2250/712* (2013.01); *F05D 2300/6033* (2013.01)

(58) Field of Classification Search
CPC ......... F05D 2250/711; F05D 2250/712; F05D 2300/6033
USPC ..................................................... 415/209.4
See application file for complete search history.

(56) References Cited

U.S. PATENT DOCUMENTS

| | | | |
|---|---|---|---|
| 8,292,580 B2* | 10/2012 | Schiavo | ................. F01D 5/189 |
| | | | 416/96 A |
| 9,206,742 B2 | 12/2015 | Chuong et al. | |
| 9,228,445 B2* | 1/2016 | Darkins, Jr. | ............ F01D 5/147 |
| 9,297,312 B2 | 3/2016 | Chuong et al. | |
| 9,771,818 B2 | 9/2017 | Budnick et al. | |
| 9,828,867 B2 | 11/2017 | Budnick | |
| 9,845,692 B2 | 12/2017 | Jamison | |
| 10,927,677 B2* | 2/2021 | Senile | .................... F01D 9/041 |
| 2010/0068034 A1* | 3/2010 | Schiavo | ................. F01D 5/282 |
| | | | 415/115 |
| 2011/0008163 A1 | 1/2011 | Prentice et al. | |
| 2012/0171028 A1 | 7/2012 | Tudor et al. | |
| 2014/0212284 A1 | 7/2014 | Jamison et al. | |
| 2015/0330249 A1 | 11/2015 | Budnick | |
| 2015/0354410 A1 | 12/2015 | Budnick et al. | |
| 2016/0123164 A1 | 5/2016 | Freeman et al. | |
| 2016/0312658 A1 | 10/2016 | Heitman et al. | |
| 2016/0348519 A1* | 12/2016 | Whitman | ................ C23C 4/134 |
| 2017/0241291 A1 | 8/2017 | Boeck | |

* cited by examiner

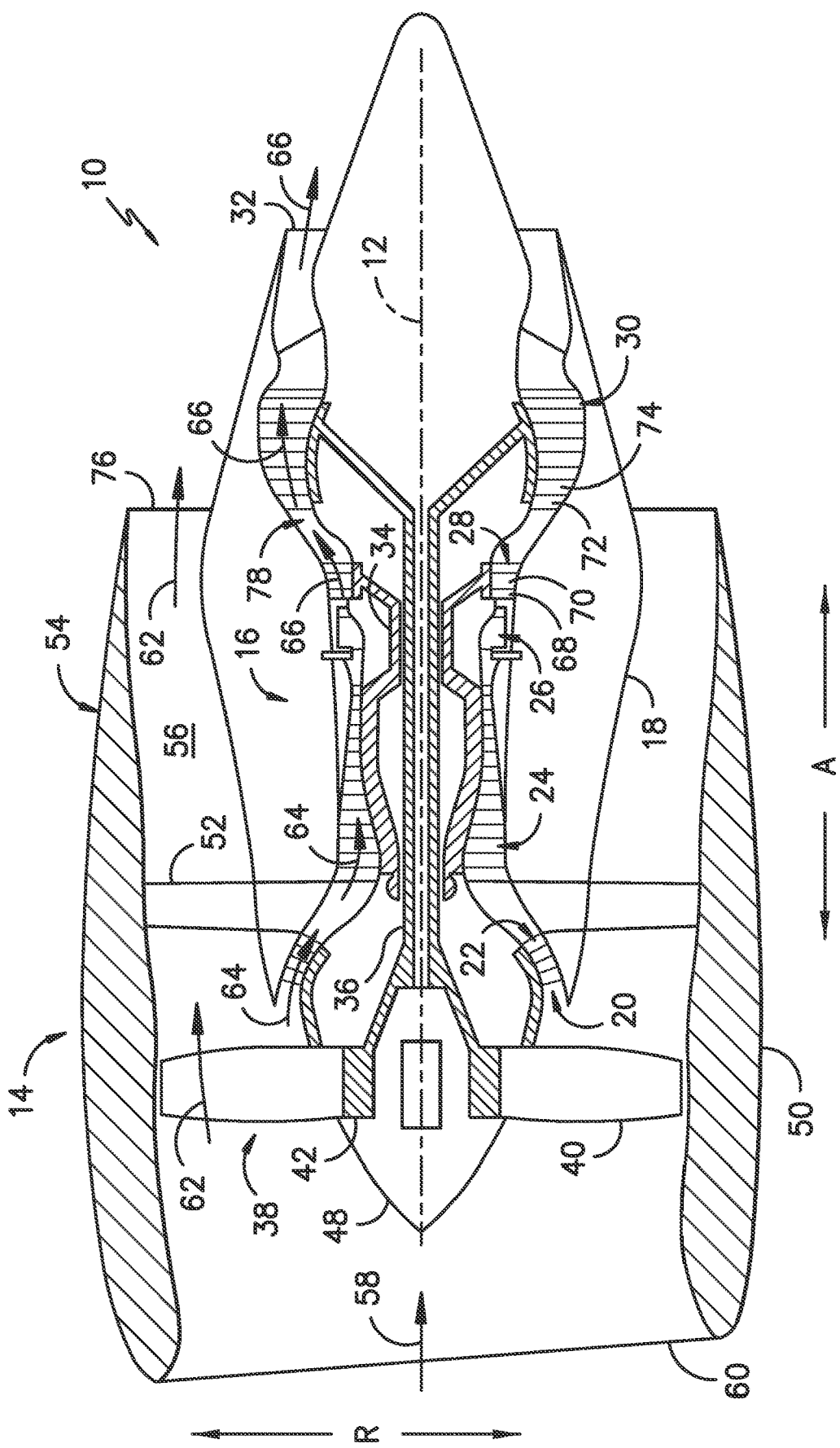
FIG. -1-

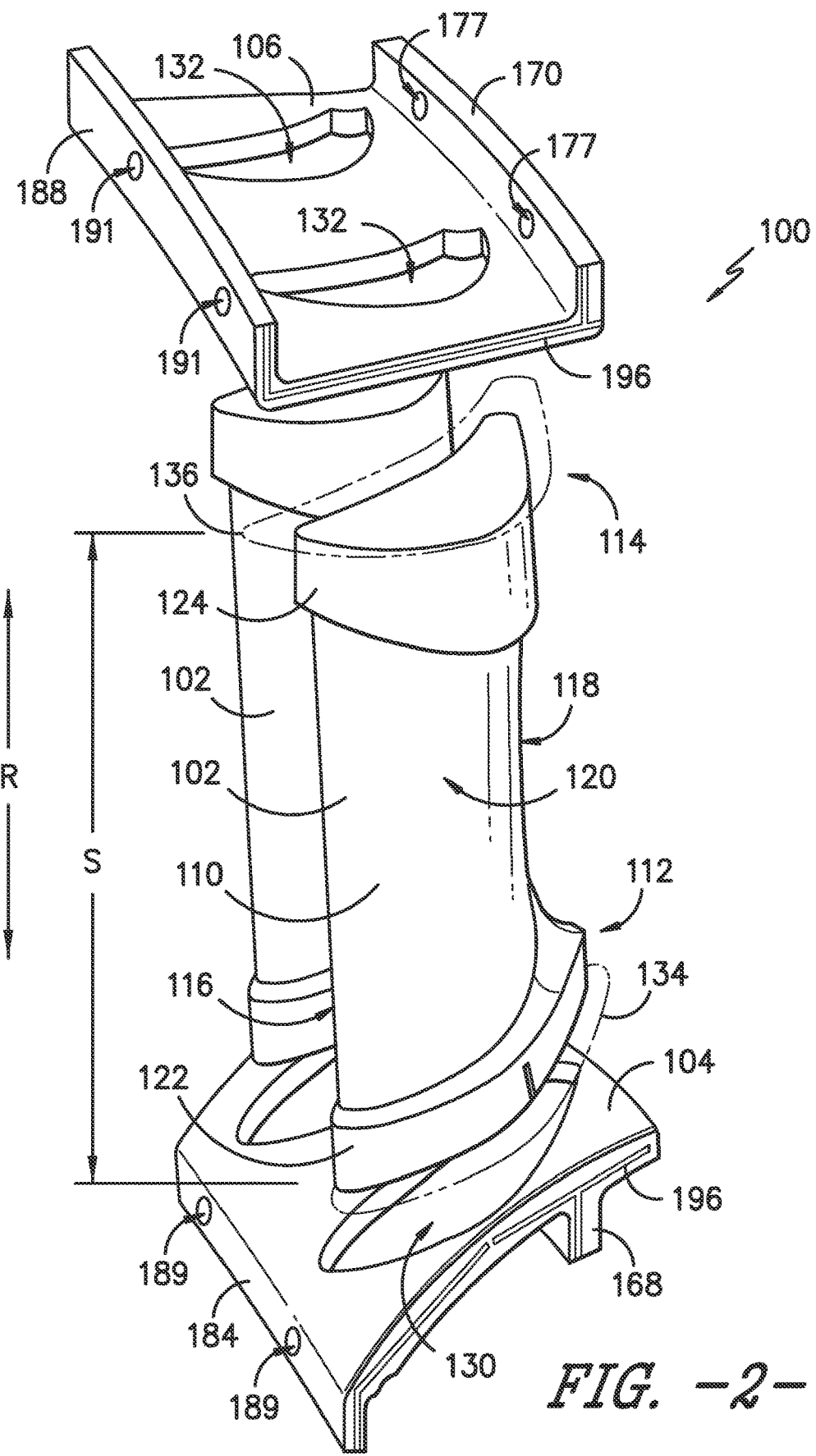
FIG. -2-

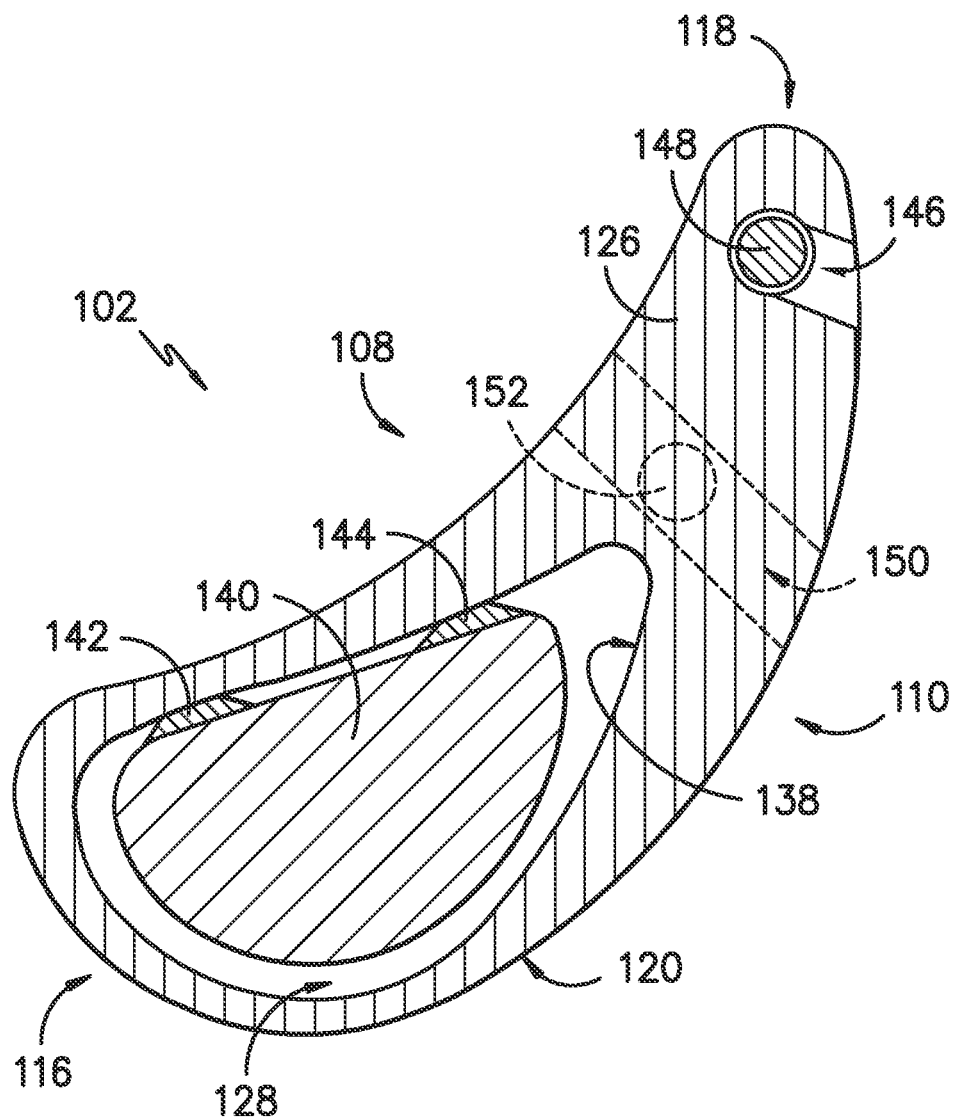
FIG. -3-

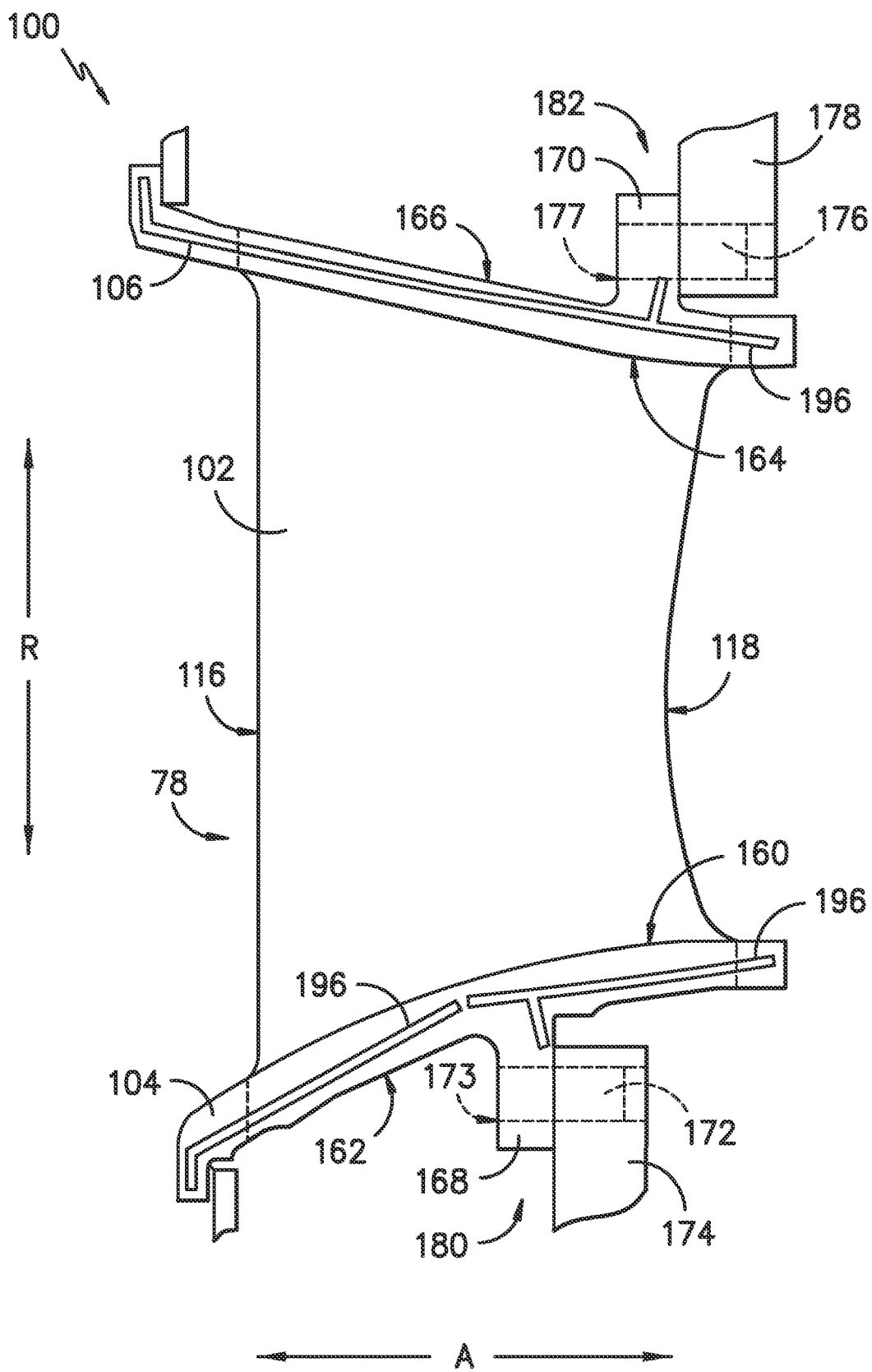
FIG. -4-

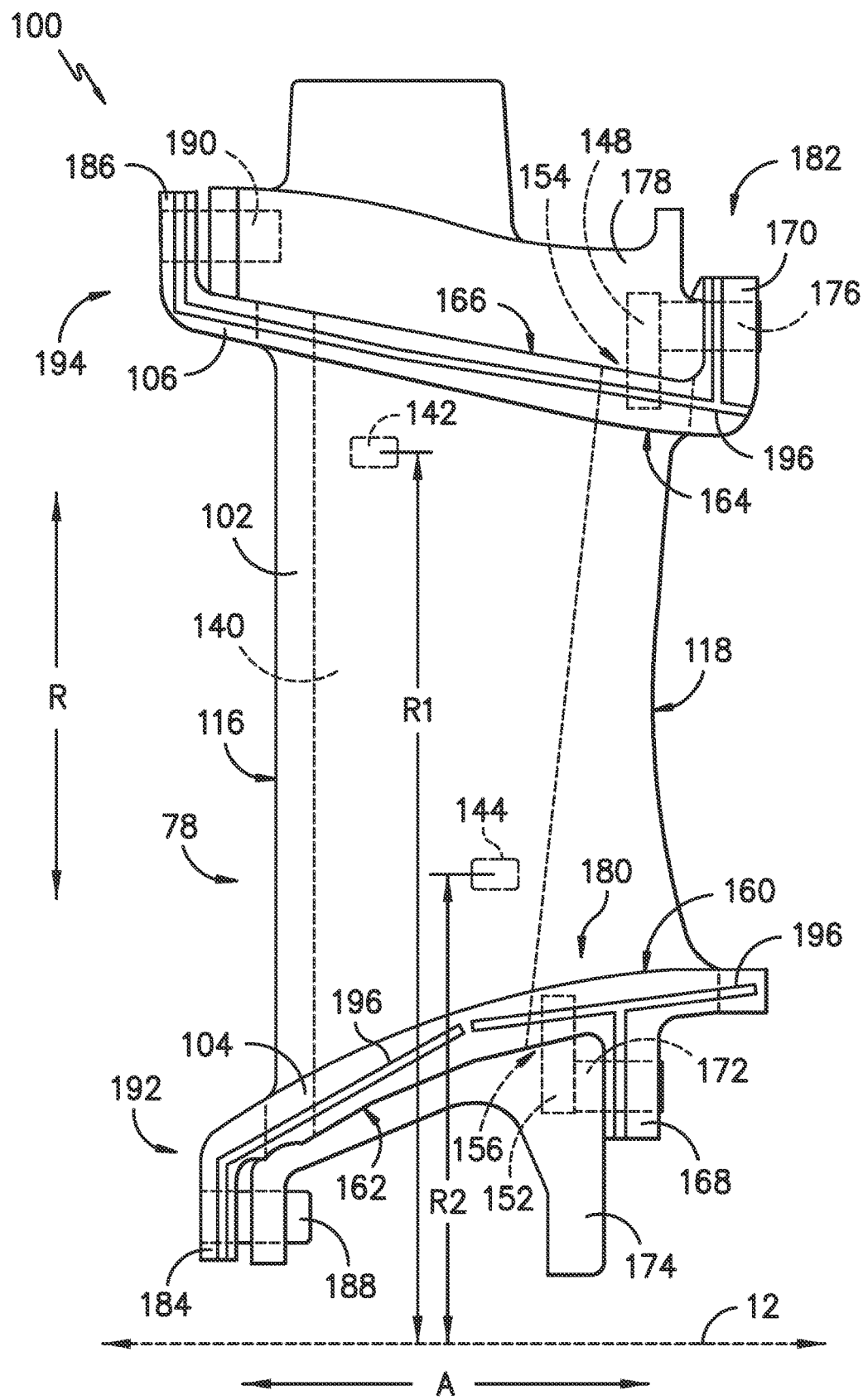
FIG. -5-

COMPOSITE AIRFOIL ASSEMBLY WITH SEPARATE AIRFOIL, INNER BAND, AND OUTER BAND

CROSS-REFERENCE TO RELATED APPLICATIONS

This application is a continuation of and claims priority to U.S. application Ser. No. 15/922,263, filed Mar. 15, 2018, the contents of which are incorporated herein by reference.

FEDERALLY SPONSORED RESEARCH

This invention was made with government support under contact number FA8650-15-D-2501 awarded by the Department of the Air Force. The U.S. government may have certain rights in the invention.

FIELD

The present subject matter relates generally to gas turbine engines. More particularly, the present subject matter relates to composite airfoil assemblies for gas turbine engines, such as composite turbine nozzle fairings for gas turbine engines.

BACKGROUND

More commonly, non-traditional high temperature composite materials, such as ceramic matrix composite (CMC) materials, are being used in applications such as gas turbine engines. Components fabricated from such materials have a higher temperature capability compared with typical components, e.g., metal components, which may allow improved component performance and/or increased engine temperatures. Composite components may provide other advantages as well, such as an improved strength to weight ratio.

Typically, a CMC turbine nozzle fairing comprises an airfoil, an inner band, and an outer band that are integrally formed as one single component, with curved transition zones between the airfoil and each of the inner band and outer band. However, the transition from the airfoil to the band sections in the CMC turbine nozzle fairing generally comprises complex shapes in the vicinity of the curvature such that the nozzle fairings are difficult to lay up, resulting in a long manufacturing cycle time and low yield, and also are difficult to compact, often resulting in poor compaction. Additionally, thermal differences, i.e., a thermal fight, between the airfoil and bands produce high stresses in the nozzle fairings, which limits the acceptability of part defects and results in tighter inspection limits for non-destructive examination of the parts. Moreover, known CMC nozzle fairings typically are singlets and can allow leakage between each separate nozzle fairing.

Accordingly, improved airfoil assemblies would be useful. In particular, an airfoil assembly comprising an airfoil that is separate from each of the inner band and outer band would be advantageous. Further, an airfoil assembly having a separate airfoil, inner band, and outer band that is simply supported, with a positively located airfoil, would be desirable.

BRIEF DESCRIPTION

Aspects and advantages of the invention will be set forth in part in the following description, or may be obvious from the description, or may be learned through practice of the invention.

In one exemplary embodiment of the present subject matter, an airfoil assembly for a gas turbine engine is provided. The airfoil assembly comprises an airfoil having a concave pressure side opposite a convex suction side and an inner end radially spaced apart from an outer end. The pressure side and the suction side extend axially from a leading edge to a trailing edge. The airfoil assembly further comprises an inner band defining an inner opening shaped complementary to the inner end of the airfoil and an outer band defining an outer opening shaped complementary to the outer end of the airfoil. The inner end of the airfoil is received with the inner opening and the outer end of the airfoil is received within the outer opening. The airfoil assembly also comprises a strut extending radially through a cavity defined by the airfoil, as well as a first pad defined at a first radial location within the cavity and a second pad defined at a second radial location within the cavity. The first radial location is different from the second radial location.

In another exemplary embodiment of the present subject matter, an airfoil assembly for a gas turbine engine is provided. The airfoil assembly comprises an airfoil having a concave pressure side opposite a convex suction side and an inner end radially spaced apart from an outer end. The pressure side and the suction side extend axially from a leading edge to a trailing edge. The airfoil assembly also comprises an inner band defining an inner opening shaped complementary to the inner end of the airfoil and an outer band defining an outer opening shaped complementary to the outer end of the airfoil. The inner end of the airfoil is received with the inner opening and the outer end of the airfoil is received within the outer opening. The inner band includes a first flowpath surface, a first non-flowpath surface opposite the first flowpath surface, and a first inner flange extending radially from the first non-flowpath surface. The outer band includes a second flowpath surface, a second non-flowpath surface opposite the second flowpath surface, and a first outer flange extending radially from the second non-flowpath surface. The inner band is secured to an inner support structure by a first inner fastener extending through the first inner flange, and the outer band is secured to an outer support structure by a first outer fastener extending through the first outer flange.

In a further exemplary embodiment of the present subject matter, an airfoil assembly for a gas turbine engine is provided. The airfoil assembly comprises an airfoil having a concave pressure side opposite a convex suction side and an inner end radially spaced apart from an outer end. The pressure side and the suction side extend axially from a leading edge to a trailing edge. The airfoil assembly further comprises an inner band defining an inner opening shaped complementary to the inner end of the airfoil and an outer band defining an outer opening shaped complementary to the outer end of the airfoil. The inner end of the airfoil is received with the inner opening and the outer end of the airfoil is received within the outer opening. The inner band includes a first flowpath surface, a first non-flowpath surface opposite the first flowpath surface, and a first inner flange extending radially from the first non-flowpath surface. The outer band includes a second flowpath surface, a second non-flowpath surface opposite the second flowpath surface, and a first outer flange extending radially from the second non-flowpath surface. The inner band is secured to an inner support structure by a first inner fastener extending through the first inner flange, and the outer band is secured to an outer support structure by a first outer fastener extending through the first outer flange. Moreover, a strut extends radially through a cavity defined by the airfoil, and a first pad is defined at a first radial location within the cavity and a second pad is defined at a second radial location within the cavity. The first radial location is different from the second radial location. Each of the inner band, outer band, and airfoil are formed from a ceramic matrix composite material.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a schematic cross-section view of an exemplary gas turbine engine according to various embodiments of the present subject matter.

FIG. 2 provides a perspective view of a doublet airfoil assembly, having two airfoils separate from an inner band and outer band, according to an exemplary embodiment of the present subject matter.

FIG. 3 provides an axial cross-section view of one airfoil of the exemplary airfoil assembly of FIG. 2.

FIG. 4 provides a side schematic view of an airfoil assembly having a single pinned flange on each of the inner band and outer band, according to an exemplary embodiment of the present subject matter.

FIG. 5 provides a side schematic view of an airfoil assembly having a double pinned flange on each of the inner band and outer band, according to an exemplary embodiment of the present subject matter.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to an axial centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the axial centerline 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

In some embodiments, components of turbofan engine 10, particularly components within or defining the hot gas path 78, may comprise a composite material, such as a ceramic matrix composite (CMC) material having high temperature capability. Composite materials generally comprise a fibrous reinforcement material embedded in matrix material, e.g., a ceramic matrix material. The reinforcement material serves as a load-bearing constituent of the composite material, while the matrix of a composite material serves to bind the fibers together and act as the medium by which an externally applied stress is transmitted and distributed to the fibers.

Exemplary CMC materials may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In other embodiments, the CMC material may be formed as, e.g., a carbon fiber cloth rather than as a tape.

Turning to FIG. 2, an exemplary airfoil assembly 100, e.g., a nozzle fairing assembly for turbofan engine 10, is illustrated. The airfoil assembly 100 comprises two airfoils 102, an inner band 104, and an outer band 106. Because the airfoil assembly 100 includes two airfoils 102 received within a single inner band 104 and a single outer band 106, the assembly may be referred to as a doublet airfoil assembly 100. In the depicted exemplary embodiment, each airfoil 102, the inner band 104, and the outer band 106 is formed from a CMC material. As shown in FIG. 2, the exemplary CMC airfoils 102 each include a concave pressure side 108 opposite a convex suction side 110. Opposite pressure and suction sides 108, 110 of the airfoil 102 radially extend between an inner end 112 and an outer end 114 along an airfoil span S. Moreover, pressure and suction sides 108, 110 of the airfoil 102 extend axially between a leading edge 116 and an opposite trailing edge 118, and the pressure and suction sides 108, 110 define an outer surface 120 of the airfoil 102. Further, each illustrated airfoil 102 includes an inner parapet 122 that extends about the airfoil 102 at its inner end 112, and an outer parapet 124 that extends about the airfoil 102 at its outer end 114. Additionally, referring to FIG. 3, each airfoil 102 includes a trailing edge portion 126 that defines its trailing edge 118. The trailing edge portion 126 is located aft of a cavity 128 defined by the airfoil 102. The cavity 128 extends the radial length, i.e., the span S, of the airfoil 102.

As further shown in FIG. 2, the inner and outer bands 104, 106 are relatively thin CMC structures that are separate from the airfoil 102. That is, each of the airfoil 102, inner band 104, and outer band 106 are separately formed from a CMC material such that each component is an individual piece. In the depicted embodiment, the airfoil assembly 100 is a turbine nozzle fairing assembly, and a plurality of airfoil assemblies 100 may be positioned circumferentially adjacent one another to form an annular turbine nozzle stage, e.g., a plurality of turbine nozzles positioned circumferentially about the axial centerline 12 of the engine 10. As such, each of the inner band 104 and outer band 106 form a liner along the hot gas path 78, protecting metallic components and the like from the heat of the combustion gases 66.

As illustrated in FIG. 2, the inner band 104 defines two inner openings 130 that are shaped complementary to the inner end 112 of each airfoil 102. As such, the inner end 112 of each airfoil 102 is received within a respective inner opening 130. Similarly, the outer band 106 defines two outer openings 132 shaped complementary to the outer end 114 of each airfoil 102, such that the outer end 114 of each airfoil 102 is received within a respective outer opening 132. An inner seal 134 extends around the inner end 112 of each airfoil 102 such that the inner seal 134 is positioned between the inner end 112 and the inner band 104 to seal against leakage through the inner opening 130. Likewise, an outer seal 136 extends around the outer end 114 of each airfoil 102 such that the outer seal 136 is positioned between the outer end 114 and the outer band 106 to seal against leakage through the outer opening 132. Moreover, the inner and outer seals 134, 136 are positioned to engage the inner band 104 and outer band 106, respectively. The inner and outer seals 134, 136 are illustrated for only one airfoil 102 in FIG. 2; the seals 134, 136 for the other airfoil 102 in FIG. 2 are omitted for clarity.

Turning to FIGS. 3, 4, and 5, the airfoil assembly 100 will be described in greater detail. FIG. 3 provides an axial cross-section view of one airfoil 102 of the exemplary airfoil assembly 100 of FIG. 2. FIG. 4 provides a side schematic view of the airfoil assembly 100 having a single pinned flange on each of the inner band 104 and outer band 106, according to one exemplary embodiment of the present subject matter. FIG. 5 provides a side schematic view of the airfoil assembly 100 having a double pinned flange on each of the inner band 104 and outer band 106, according to another exemplary embodiment of the present subject matter.

As illustrated in FIGS. 3 and 5, a strut 140 extends radially through each airfoil 102, the inner band 104, and the outer band 106 of the airfoil assembly 100. More particularly, the strut 140 extends through each airfoil 102 within the cavity 128 defined in the airfoil 102. The strut 140 includes a first pad 142 at a first radial location R1 within the cavity 128 and a second pad 144 at a second radial location R2 within the cavity 128. As depicted in FIG. 5, the first radial location R1 is different from the second radial location R2, and the first and second radial locations R1, R2 are determined from the axial centerline 12 of the engine 10. In other embodiments, the first and second pads 142, 144 may be defined on the airfoil 102 rather than the strut 140. Although not illustrated in FIG. 4, it will be appreciated that a strut 140 could extend through the airfoil 102 as shown in FIGS. 3 and 5.

Keeping with FIGS. 3 and 5, the airfoil 102 is also constrained axially such that axial loading of the airfoil 102 transfers the load to an inner support structure 174 and an outer support structure 178. As shown, a radially extending first slot 146 is defined in the trailing edge portion 126 of each airfoil 102. Each first slot 146 is configured for receipt of a first pin 148. Further, a radially extending second slot 150 is defined in each airfoil 102 for receipt of a second pin 152. The depicted airfoil assembly 100 could be configured as a first stage or a second stage turbine nozzle assembly, i.e., when installed within a gas turbine engine. If configured as a second stage assembly 100, the first slot 146 is defined in the outer end 114 of each airfoil 102, and the second slot 150 is defined in the inner end 112 of each airfoil 102. A first aperture 154 is defined in the outer support structure 178 adjacent each first slot 146 such that each first pin 148 passes through the first aperture 154 into the first slot 146, and a second aperture 156 is defined in the inner support structure 174 adjacent each second slot 150 such that each second pin 152 passes through the second aperture 156 into the second slot 150. Thus, each airfoil 102 is constrained axially by a pair of pins 148, 152 extending radially into the airfoil 102, the first pin 148 at the outer end 114 of the trailing edge portion 126, and the second pin 152 at the inner end 112 of the airfoil 102 just aft of the cavity 128. Further, the pins 148, 152 prevent the airfoil 102 from bottoming out within the openings 130, 132, as well as from pulling out of the openings 130, 132.

For a second stage nozzle assembly, the depicted pin configuration supports and locates the respective airfoil 102, with the axial loads passing into the inner and outer support structures 174, 178. However, it will be appreciated that where the airfoil assembly 100 is a first stage nozzle assembly (e.g., as illustrated in FIG. 4), the first slots 146 are typically defined in the inner end 112 of the airfoil 102, and the second slots 150 are typically defined in the outer end 114 of the airfoil 102. Likewise, in such embodiments, the first apertures 154 are defined in the inner support structure 174 such that the first pins 148 pass through the first aperture 154 into the first slot 146 at the inner end 112 of the trailing edge portion 126 of each airfoil 102, and the second apertures 156 are defined in the outer support structure 178 such that the second pins 152 pass through the outer support structure 178 into the second slot 150 just aft of the cavity 128 of each airfoil 102. Such a pin configuration adequately axially constrains the first stage nozzle assembly 100, supporting and locating each airfoil 102 of the assembly 100 such that the axial loads pass into the inner and outer support structures 174, 178. As such, the second stage nozzle is cantilevered from the outer casing 18, with an inter-stage seal attached to the inner support structure 174. The cantilevered configuration may be applied to nozzles of any turbine stage that requires the nozzles to be cantilevered, e.g., third, fourth, etc. stage nozzles. In contrast, the first stage nozzle is non-cantilevered, with the inner and outer support structures 174, 178 being supported by the engine's static structure, e.g., outer casing 18.

Further, in either the first or second stage embodiment of the airfoil assembly 100, the first and second pins 148, 152 radially constrain each airfoil 102. Moreover, referring to FIG. 3, each airfoil 102 is configured to contact the first and second pads 142, 144 of the strut 140 extending through the airfoil 102 and load the slot 146 into the pin 148 when the airfoil 102 is tangentially loaded. More specifically, when each airfoil 102 experiences a tangential load, the airfoil 102 is configured to load into the pads 142, 144 such that an interior surface 138 of the airfoil 102, which defines the cavity 128 of the airfoil 102, contacts the first and second pads 142, 144. More generally, e.g., for embodiments in which the pads 142, 144 are not part of or attached to the strut 140, the first and second pads 142, 144 provide a loading surface or stop for the airfoil 102 to load into the strut 140 when the airfoil 102 is tangentially loaded. As such, the first and second pads 142, 144 and the first pin 148 transfer the tangential loads to the strut 140 and inner support structure 174. The first and second pins 148, 152 support and locate each airfoil 102 while transferring radial and axial loads to the inner and outer support structures 174, 178.

Further, in exemplary embodiments of the airfoil assembly 100, the strut 140 is formed from a metallic material, such as a metal or metal alloy. Accordingly, the CMC airfoil 102 and the metallic strut 140 have different coefficients of thermal expansion $\alpha$. As previously described, each airfoil 102 is separate from the inner band 104 and outer band 106, and is not attached or fastened to the strut 140, and as such, the airfoil 102 is free to float radially to accommodate the difference in coefficients of thermal expansion $\alpha$ between the airfoil 102 and the strut 140. That is, the strut 140 will begin to expand at a lower temperature than each airfoil 102, and the airfoil 102 has freedom to move radially to accommodate the thermal expansion of the strut 140.

Turning now to FIGS. 4 and 5, the inner band 104 includes a first flowpath surface 160 and a first non-flowpath surface 162 opposite the first flowpath surface 160. Similarly, the outer band 106 includes a second flowpath surface 164 and a second non-flowpath surface 166 opposite the second flowpath surface 164. The first and second flowpath surfaces 160, 164 help define the hot gas path 78, while the first and second non-flowpath surfaces 162, 166 are positioned outside of the hot gas path 78.

Referring particularly to FIG. 4, in one exemplary embodiment, a first inner flange 168 extends radially from the first non-flowpath surface 162, and a first outer flange 170 extends radially from the second non-flowpath surface 166. A first inner fastener 172 extends through an aperture 173 in the first inner flange 168 and into the inner support structure 174 to secure the inner band 104 to the inner support structure 174. Likewise, a first outer fastener 176 extends through an aperture 177 in the first outer flange 170 and into the outer support structure 178 to secure the outer band 106 to the outer support structure 178. Thus, the exemplary embodiment of FIG. 4 comprises a single pinned flange on each of the inner band 104 and outer band 106 to attach the bands 104, 106 to their respective support structures 174, 178, e.g., metallic hangers or the like. It will be appreciated that more than one inner fastener 172 and outer fastener 176, e.g., each inner fastener 172 and each outer fastener 176 circumferentially spaced apart from one another, may pass through the inner band 104 and outer band 106, respectively, to secure the inner and outer bands 104, 106 to their respective support structures 174, 178. In such embodiments, the aperture 173 for an additional inner fastener 172 and the aperture 177 for an additional outer fastener 176 extend in the circumferential direction C to account for the thermal expansion difference between the support structures 174, 178 (e.g., metal hangers) and the CMC bands 104, 106.

As shown in FIG. 4, the first inner flange 168 extends from the first non-flowpath surface 162 near a mid-portion 180 of the inner band 104, and the first outer flange 170 extends from the second non-flowpath surface 166 near an aft end 182 of the outer band 106. Preferably, each of the first inner flange 168 and the first outer flange 170 are defined on the respective band 104, 106 near a resultant pressure force to minimize moment into the pin joint between the first inner flange 168 and the inner support structure 174 and the first outer flange 170 and the outer support structure 178. That is, the various forces formed by a pressure distribution across the bands 104, 106 produce a moment at each pin joint. The position of each flange 168, 178 on its respective band 104, 106 is selected to minimize the moment created by the pressure forces that is taken through each pin 148, 152.

Referring now to FIG. 5, in another exemplary embodiment of the airfoil assembly 100, each of the inner band 104 and outer band 106 includes a double pinned flange attaching the band 104, 106 to its respective support structure 174, 178. More particularly, in addition to the first inner flange 168, the inner band 104 includes a second inner flange 184 extending radially from the first non-flowpath surface 162, and in addition to the first outer flange 170, the outer band 106 includes a second outer flange 186 extending radially from the second non-flowpath surface 166. A second inner fastener 188 extends through an aperture 189 (FIG. 2) in the second inner flange 184 and into the inner support structure 174, and a second outer fastener 190 extends through an aperture 191 (FIG. 2) in the second outer flange 186 and into the outer support structure 178. As such, the first and second inner fasteners 172, 188 secure the inner band 104 to the inner support structure 174, and the first and second outer fasteners 176, 190 secure the outer band 106 to the outer support structure 178. As described above, more than one inner fastener 188 and outer fastener 190, e.g., each inner fastener 188 and each outer fastener 190 circumferentially spaced apart from one another, may pass through the inner band 104 and outer band 106, respectively, to secure the inner and outer bands 104, 106 to their respective support structures 174, 178. In such embodiments, the aperture 189 for an additional inner fastener 188 and the aperture 191 for an additional outer fastener 190 extend in the circumferential direction C to account for the thermal expansion difference between the support structures 174, 178 (e.g., metal hangers) and the CMC bands 104, 106.

As further depicted in FIG. 5, in the double pinned embodiment, the first inner flange 168 extends from the first non-flowpath surface 162 of the inner band 104 near the mid-portion 180 of the inner band 104. The second inner flange 184 extends from the first non-flowpath surface 162 near a forward end 192 of the inner band 104. Moreover, the first outer flange 170 extends from the second non-flowpath surface 166 of the outer band 106 near the aft end 182 of the outer band 106, while the second outer flange 186 extends from the second non-flowpath surface 166 near a forward end 194 of the outer band 106. As a result, the first inner flange 168 and the second inner flange 184 extend from the first non-flowpath surface 162 of the inner band 104 such that the first and second inner flanges 168, 184 straddle the inner support structure 174. Similarly, the first outer flange 170 and the second outer flange 186 extend from the second non-flowpath surface 166 of the outer band 106 such that the first and second outer flanges straddle the outer support structure 178. As such, the first and second inner flanges 168, 184 wrap around the inner support structure 174 and the first and second outer flanges 170, 186 wrap around the outer support structure 178, thereby forming a CMC liner around each of the first and outer support structures 174, 178 out of the direct flow path 78 of the combustion gases 66. As previously described, the support structures 174, 178 may be hangers formed from a metallic material, e.g., a metal or metal alloy, such that the CMC bands 104, 106 with their flanges 168, 184, 170, 186 help protect the support structures 174, 178 from the high temperature combustion gases 66.

Additionally, although the airfoil assembly 100 depicted in the exemplary embodiments includes two airfoils, the airfoil assembly 100 described herein could be formed as a singlet, triplet, etc. More particularly, for a singlet assembly 100, the inner band 104 defines one inner opening 130 and the outer band 106 defines one outer opening 132. A single airfoil 102 extends from the inner band 104 to the outer band 106 with the inner end 112 of the airfoil 102 positioned in the inner opening 130 and the outer end 114 of the airfoil 102 positioned in the corresponding outer opening 132. A triplet airfoil assembly 100 would include three airfoils 102, with each airfoil 102 extending between an inner opening 130 and an outer opening 132 such that the triplet assembly 100 includes three inner openings 130 and three outer openings 132. An airfoil assembly 100 including any appropriate number of airfoils 102 extending from the inner band 104 and outer band 106 may be formed. It will be appreciated that, by reducing the number of inner and outer band segments, split line leakage, i.e., leakage between adjacent inner and outer band segments, can be reduced. More specifically, split line leakage is eliminated where splits in the inner band 104 and outer band 106 are eliminated to form a doublet, triplet, etc. airfoil assembly 100. However, as shown in FIGS. 2, 4, and 5, seals 196 also may be included between adjacent inner and outer bands 104, 106 to help minimize leakage between band segments.

As described herein, the airfoils 102, inner band 104, and outer band 106 may be formed from a CMC material. After laying up the CMC plies as previously described to form a layup or preforms for each of the airfoils 102, inner band 104, and outer band 106, the layups are debulked and, if appropriate, cured while subjected to elevated pressures and temperatures to produce cured preforms, e.g., the layups may be cured in an autoclave to form autoclaved bodies. In exemplary embodiments, the autoclaved bodies are then heated (fired) in a vacuum or inert atmosphere to decompose the binders, remove the solvents, and convert the precursor to the desired ceramic matrix material. Due to decomposition of the binders, the result for each preform is a porous CMC fired body that may undergo densification, e.g., melt infiltration (MI), to fill the porosity and yield the respective CMC component.

Specific processing techniques and parameters for the above process will depend on the particular composition of the materials. For example, silicon CMC components may be formed from fibrous material that is infiltrated with molten silicon, e.g., through a process typically referred to as the Silcomp process. Another technique of manufacturing CMC components is the method known as the slurry cast melt infiltration (MI) process. In one method of manufacturing using the slurry cast MI method, CMCs are produced by initially providing plies of balanced two-dimensional (2D) woven cloth comprising silicon carbide (SiC)-containing fibers, having two weave directions at substantially 90° angles to each other, with substantially the same number of fibers running in both directions of the weave. The term "silicon carbide-containing fiber" refers to a fiber having a composition that includes silicon carbide, and preferably is substantially silicon carbide. For instance, the fiber may have a silicon carbide core surrounded with carbon, or in the reverse, the fiber may have a carbon core surrounded by or encapsulated with silicon carbide.

Other techniques for forming CMC components include polymer infiltration and pyrolysis (PIP) and oxide/oxide processes. In PIP processes, silicon carbide fiber preforms are infiltrated with a preceramic polymer, such as polysilazane and then heat treated to form a SiC matrix. In oxide/oxide processing, aluminum or alumino-silicate fibers may be pre-impregnated and then laminated into a preselected geometry. Components may also be fabricated from a carbon fiber reinforced silicon carbide matrix (C/SiC) CMC. The C/SiC processing includes a carbon fibrous preform laid up on a tool in the preselected geometry. As utilized in the slurry cast method for SiC/SiC, the tool is made up of graphite material. The fibrous preform is supported by a tool during a chemical vapor infiltration process at about 1200° C., whereby the C/SiC CMC component is formed. In still other embodiments, 2D, 2.5D, and/or 3D preforms may be utilized in MI, CVI, PIP, or other processes. For example, cut layers of 2D woven fabrics may be stacked in alternating weave directions as described above, or filaments may be wound or braided and combined with 3D weaving, stitching, or needling to form 2.5D or 3D preforms having multiaxial fiber architectures. Other ways of forming 2.5D or 3D preforms, e.g., using other weaving or braiding methods or utilizing 2D fabrics, may be used as well.

Optionally, after processing, the CMC component (i.e., CMC airfoil 102, CMC inner band 104, and CMC outer band 106) may be finish machined, if and as needed, and coated with one or more coatings, such as an environmental barrier coating (EBC). Moreover, the method described above is provided by way of example only. As an example, other known methods or techniques for curing composite plies, as well as for densifying a CMC component, may be utilized. Alternatively, any combinations of these or other known processes may be used. Further, although in the exemplary embodiments described herein the airfoil assembly 100 as a turbine nozzle fairing assembly, it will be appreciated that the airfoil assembly 100 could be any nozzle fairing assembly. Additionally, although described herein with respect to CMC airfoils 102, CMC inner bands 104, and CMC outer bands 106, the present subject matter could be applied to an airfoil assembly 100 formed from any suitable material, such as a polymer matrix composite (PMC) material or other composite material. Moreover, the airfoil assembly 100 may comprise any appropriate combination of materials, e.g., in some embodiments, at least one of the airfoil 102, inner band 104, or outer band 106 may be formed from a different material than the remainder of the components of the airfoil assembly.

Accordingly, as described herein, an airfoil assembly having airfoils separate from an inner band and an outer band may be constructed. By forming each component of the airfoil assembly as a separate piece, complicated CMC ply layups may be avoided, which may reduce the complexity of the manufacturing process for the airfoil assembly while increasing part yield and maintaining suitable compaction of each component part of the airfoil assembly. Further, separating each airfoil of the assembly from the inner and outer bands eliminates stresses due to the thermal fight between the airfoil and bands. By eliminating such stresses, the airfoil assemblies described herein are more defect tolerant than known integral airfoil and band designs, which opens up the non-destructive examination limits of the assemblies. Separation of the airfoil and bands also enables doublet, triplet, etc. airfoil assemblies, which eliminate split line leakage. Therefore, compared to known airfoil assembly designs, the airfoil assemblies described herein have improved producibility and reduced stresses, which reduces defects and increases acceptability of the airfoil assemblies. Other advantages of the subject matter described herein also may be realized by those of ordinary skill in the art.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. An airfoil assembly for a gas turbine engine, comprising:
   an airfoil having a concave pressure side opposite a convex suction side and an inner end spaced apart from an outer end along a radial direction, the pressure side and the suction side extending along an axial direction from a leading edge to a trailing edge, the airfoil defining a cavity, the airfoil including a trailing edge portion located aft of the cavity and defining the trailing edge, a first slot extending longitudinally along the radial direction defined in the trailing edge portion for receipt of a first pin; and
   an inner band defining an inner opening shaped complementary to the inner end of the airfoil, wherein the inner end of the airfoil is received with the inner opening, and wherein each of the inner band and airfoil are formed from a ceramic matrix composite material.

2. The airfoil assembly of claim 1, wherein a second slot extending along the radial direction is defined in the airfoil for receipt of a second pin.

3. The airfoil assembly of claim 2, wherein the first slot is defined in the inner end of the airfoil and the second slot is defined in the outer end of the airfoil.

4. The airfoil assembly of claim 1, wherein the inner band includes a flowpath surface, a non-flowpath surface opposite the flowpath surface, and a first inner flange and a second inner flange extending along the radial direction from the non-flowpath surface.

5. The airfoil assembly of claim 4, wherein the inner band is secured to an inner support structure by a first inner fastener extending through the first inner flange and a second inner fastener extending through the second inner flange.

6. The airfoil assembly of claim 5, wherein the first inner flange and the second inner flange extend from the non-flowpath surface of the inner band such that the first inner flange and the second inner flange straddle the inner support structure.

7. The airfoil assembly of claim 1, further comprising:
a strut extending along the radial direction through a cavity defined by the airfoil; and
a first pad defined at a first radial location within the cavity and a second pad defined at a second radial location within the cavity, the first radial location different from the second radial location.

8. An airfoil assembly for a gas turbine engine, comprising:
an airfoil having a concave pressure side opposite a convex suction side and an inner end spaced apart from an outer end along a radial direction, the pressure side and the suction side extending along an axial direction from a leading edge to a trailing edge, the airfoil defining a cavity, the airfoil including a trailing edge portion located aft of the cavity and defining the trailing edge, a first slot extending longitudinally along the radial direction defined in the trailing edge portion for receipt of a first pin; and
an outer band defining an outer opening shaped complementary to the outer end of the airfoil,
wherein the outer end of the airfoil is received with the outer opening, and
wherein each of the outer band and airfoil are formed from a ceramic matrix composite material.

9. The airfoil assembly of claim 8, wherein a second slot extending along the radial direction is defined in the airfoil for receipt of a second pin.

10. The airfoil assembly of claim 9, wherein the first slot is defined in the outer end of the airfoil and the second slot is defined in the inner end of the airfoil.

11. The airfoil assembly of claim 8, wherein the outer band includes a flowpath surface, a non-flowpath surface opposite the flowpath surface, and a first outer flange and a second outer flange extending along the radial direction from the non-flowpath surface.

12. The airfoil assembly of claim 11, wherein the outer band is secured to an outer support structure by a first outer fastener extending through the first outer flange and a second outer fastener extending through the second outer flange.

13. The airfoil assembly of claim 12, wherein the first outer flange and the second outer flange extend from the non-flowpath surface of the outer band such that the first outer flange and the second outer flange straddle the outer support structure.

14. The airfoil assembly of claim 8, further comprising:
an inner band defining an inner opening shaped complementary to the inner end of the airfoil,
wherein the inner end of the airfoil is received with the inner opening, and
wherein the inner band is formed from a ceramic matrix composite material.

15. The airfoil assembly of claim 8, further comprising:
a strut extending along the radial direction through a cavity defined by the airfoil; and
a first pad defined at a first radial location within the cavity and a second pad defined at a second radial location within the cavity, the first radial location different from the second radial location.

16. An airfoil assembly for a gas turbine engine, comprising:
an airfoil having a concave pressure side opposite a convex suction side and an inner end spaced apart from an outer end along a radial direction, the pressure side and the suction side extending along an axial direction from a leading edge to a trailing edge, the airfoil defining a cavity, the airfoil including a trailing edge portion located aft of the cavity and defining the trailing edge;
an inner band defining an inner opening shaped complementary to the inner end of the airfoil; and
an outer band defining an outer opening shaped complementary to the outer end of the airfoil,
wherein the inner end of the airfoil is received with the inner opening and the outer end of the airfoil is received within the outer opening,
wherein the airfoil is constrained along the axial direction by a pair of pins, each pin of the pair of pins having a diameter and an axial length, the axial length of each pin of the pair of pins extending along the radial direction into the airfoil, and
wherein each of the inner band, outer band, and airfoil are formed from a ceramic matrix composite material.

17. The airfoil assembly of claim 16, wherein a slot extending longitudinally along the radial direction is defined in the trailing edge portion for receipt of one pin of the pair of pins.

18. The airfoil assembly of claim 16, wherein the inner band includes a first flowpath surface, a first non-flowpath surface opposite the first flowpath surface, and a first inner flange and a second inner flange extending along the radial direction from the first non-flowpath surface adjacent a forward end of the inner band,
wherein the outer band includes a second flowpath surface, a second non-flowpath surface opposite the second flowpath surface, and a first outer flange and a second outer flange extending along the radial direction from the second non-flowpath surface,
wherein the first outer flange extends from the second non-flowpath surface of the outer band adjacent an aft end of the outer band, and
wherein the second outer flange extends from the second non-flowpath surface of the outer band adjacent a forward end of the outer band.

19. The airfoil assembly of claim 16, wherein a first slot extending longitudinally along the radial direction is defined in the trailing edge portion for receipt of a first pin of the pair of pins, wherein a second slot extending longitudinally along the radial direction is defined in the airfoil for receipt of a second pin of the pair of pins, wherein the first slot is defined in the outer end of the airfoil and the second slot is defined in the inner end of the airfoil, wherein a first aperture is defined in an outer support structure such that the first pin passes through the first aperture into the first slot, and wherein a second aperture is defined in an inner support structure such that the second pin passes through the second aperture into the second slot.

20. The airfoil assembly of claim 19, wherein the inner band includes a first flowpath surface, a first non-flowpath surface opposite the first flowpath surface, and a first inner flange and a second inner flange extending along the radial direction from the first non-flowpath surface such that the first inner flange and the second inner flange straddle the inner support structure, and wherein the outer band includes a second flowpath surface, a second non-flowpath surface opposite the second flowpath surface, and a first outer flange and a second outer flange extending along the radial direction from the second non-flowpath surface such that the first outer flange and the second outer flange straddle the outer support structure.

\* \* \* \* \*